(12) United States Patent
Oliver

(10) Patent No.: US 9,104,404 B2
(45) Date of Patent: Aug. 11, 2015

(54) SYSTEM AND METHOD FOR SUPPORTING A DEFERRED REFERENCE TO AN OBJECT IN AN OBJECTED-ORIENTED PROGRAMMING LANGUAGE ENVIRONMENT

(71) Applicant: Oracle International Corporation, Redwood Shores, CA (US)

(72) Inventor: Brian Oliver, Acton, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 73 days.

(21) Appl. No.: 13/783,024

(22) Filed: Mar. 1, 2013

(65) Prior Publication Data

US 2013/0298108 A1   Nov. 7, 2013

Related U.S. Application Data

(60) Provisional application No. 61/643,826, filed on May 7, 2012.

(51) Int. Cl.
*G06F 9/44* (2006.01)
*G06F 9/45* (2006.01)

(52) U.S. Cl.
CPC ..................................... *G06F 8/315* (2013.01)

(58) Field of Classification Search
None
See application file for complete search history.

(56) References Cited

U.S. PATENT DOCUMENTS 6,253,252 B1 * 6/2001 Schofield ..................... 719/315

FOREIGN PATENT DOCUMENTS

EP   1235149 A2   8/2002

OTHER PUBLICATIONS

Tom Negrino, Dori Smith. Javascript: Visual Quickstart Guide, Eighth Edition. 2012. pp. 128, 144 and 258.*
Unknown, "Deferred Reference", Twisted Matrix Labs documentation, Dec. 2010 [online], retrieved from: <http://twistedmatrix.com/documents/10.1.0/core/howto/defer.html>, 11 pages.*
Unknown, "Deferreds Tutorial", Mar. 2009 [online], retrieved on Aug. 2014, retrieved from :<http://moshez.files.wordpress.com/2009/03/deferred-pres.pdf>, 23 pages.*
Jeremy Blosser, "Explore the Dynamic Proxy API", Nov. 2000 [online], retrieved on Aug. 2014, retrieved from :<http://www.javaworld.com/article/2076233/java-se/explore-the-dynamic-proxy-api.html>, 12 pages.*
Srijeeb Roy "Generically chain dynamic proxies", Jan. 2006 [online], retrieved Aug. 2014, retrieved from :<http://www.javaworld.com/article/2071723/java-se/generically-chain-dynamic-proxies.html>.*

(Continued)

*Primary Examiner* — Don Wong
*Assistant Examiner* — Shirin Alizadeh
(74) *Attorney, Agent, or Firm* — Tucker Ellis LLP

(57) ABSTRACT

A system and method can support a deferred reference in an object-oriented programming language environment. The object-oriented programming language environment can include an interface that can provide a deferred reference to an object that will be available at a future time. Furthermore, after receiving a request from a caller to get the object based on the deferred reference, the interface can return the object to the caller when the object is available or can indicate to the caller when the object is not currently available and/or when the object will never become available.

20 Claims, 4 Drawing Sheets

(56) References Cited

OTHER PUBLICATIONS

Christopher J.Holgate "The Reaction Asynchronous Programming", Mar. 2013 [online], retrieved Aug. 2014, retrieved from < http://www.zynaptic.com/reaction/userguide/userguide.pdf>.*

Unknown "Deferred Reference", Twisted Matrix Labs documentation, Dec. 2010 [online], retrieved from: <http://twistedmatrix.com/documents/10.1.0/core/howto/defer.html>, 11 pages.*

Unknown "Hysl_reservations", [online], retrieved from : <http://docs.oracle.com/cd/E12825_01/epm.111/dds_javadoc/Hysl_reservations_cls.html>.*

Tom Negrino, Dori Smith. Javascript: Visual Quickstart Guide, Eighth Edition, 2012. pp. 128. 144 and 258.*

Unknown "Deferred Tutorial", Mar. 2009 [online], retrieved from: <http://moshez.files.wordpress.com/2009/03/deferred-press.pdf>, 23 pages.*

Jeremy Blosser, "Explore the dynamic Proxy API", Nov. 2000 [online], retrieved from :<http://www.jawaworld.com/article/2076233/java-se/explore-the-dynamic-proxy-api.html> 12 pages.*

Ben Nadel, Using jQuery Deferred.notify( ) to provide locally cached data, Sep. 2012, retrieved on Jan. 2015, retrieved from internet :<www.bennadel.com/blog/2427-using-jquery-deferred-notify-to-provide-locally-cached-data.htm>.*

International Search Report dated Sep. 11, 2013 for Application No. PCT/US2013/039256, 12 pages.

Unknown, "Deferred Reference", Twisted Matrix Labs documentation, Oct. 28, 2013, retrieved from: <http://twistedmatrix.com/documents/10.1.0/core/howto/defer.html>, 11 pages.

The jQuery Project: "Deferred Object", jQuery API, Oct. 28, 2013, XP002711799, retrieved from: <http://www.jquerysdk.com/category/deferred-object>, 3 pages.

* cited by examiner

```
1    interface Deferred<T>
2    {
3        T get() throws ObjectNotAvailableException;   //a runtime exception
4
5        Class<T> getDeferredClass();   //so we can determine the class of the referent without it actually existing
6    }
```

*FIGURE 2*

```
1  String sJMXConnectionURL = ...;
2  Map<String, Object> mapEnv = ...;
3  ObjectName objectName = ...;
4  JMXConnector connector = JMXConnectorFactory.newJMXConnector(sJMXConnectionURL, mapEnv);
5  MBeanServerConnection connection = connector.getMBeanServerConnection();
6  MBeanInfo info = connection.getMBeanInfo(objectName);
```

*FIGURE 3*

SYSTEM AND METHOD FOR SUPPORTING A DEFERRED REFERENCE TO AN OBJECT IN AN OBJECTED-ORIENTED PROGRAMMING LANGUAGE ENVIRONMENT

CLAIM OF PRIORITY

This application claims priority on U.S. Provisional Patent Application No. 61/643,826, entitled "SYSTEM AND METHOD FOR PROVIDING DEFERRED REFERENCE TO AN OBJECT" filed May 7, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting an object-oriented programming language environment.

BACKGROUND

Object-oriented programming (OOP) can be used to design applications and computer programs based on objects, which are usually instances of a class. The OOP techniques can include features such as data abstraction, encapsulation, messaging, modularity, polymorphism, and inheritance. Each object, which can have a distinct role or responsibility, is capable of receiving messages, processing data, and sending messages to other objects. Additionally, these objects can be closely associated with various actions, or methods. This is the general area that embodiments of the invention are intended to address.

SUMMARY

Described herein are systems and methods that can support a deferred reference in an object-oriented programming language environment. The object-oriented programming language environment can include an interface that can provide a deferred reference to an object that will be available at a future time. Furthermore, after receiving a request from a caller to get the object based on the deferred reference, the interface can return the object to the caller when the object is available or can indicate to the caller when the object is not currently available and/or when the object will never become available.

BRIEF DESCRIPTION OF THE FIGURES

FIG. 2 shows an illustration of an exemplary interface for defining a deferred type in an OOP environment in accordance with an embodiment of the invention.

FIG. 3 shows an illustration of an exemplary software pseudo code for acquiring management bean information from a server, in accordance with an embodiment of the invention.

DETAILED DESCRIPTION

Described herein are systems and methods that can support a deferred reference in an object-oriented programming (OOP) environment.

A reference object can encapsulate a reference to another object, or a referent, so that the reference itself can be examined and manipulated like the referent object. A deferred reference represents a referent that may not exist yet, may not be available or will only become available at some point in the future.

Figure 1:
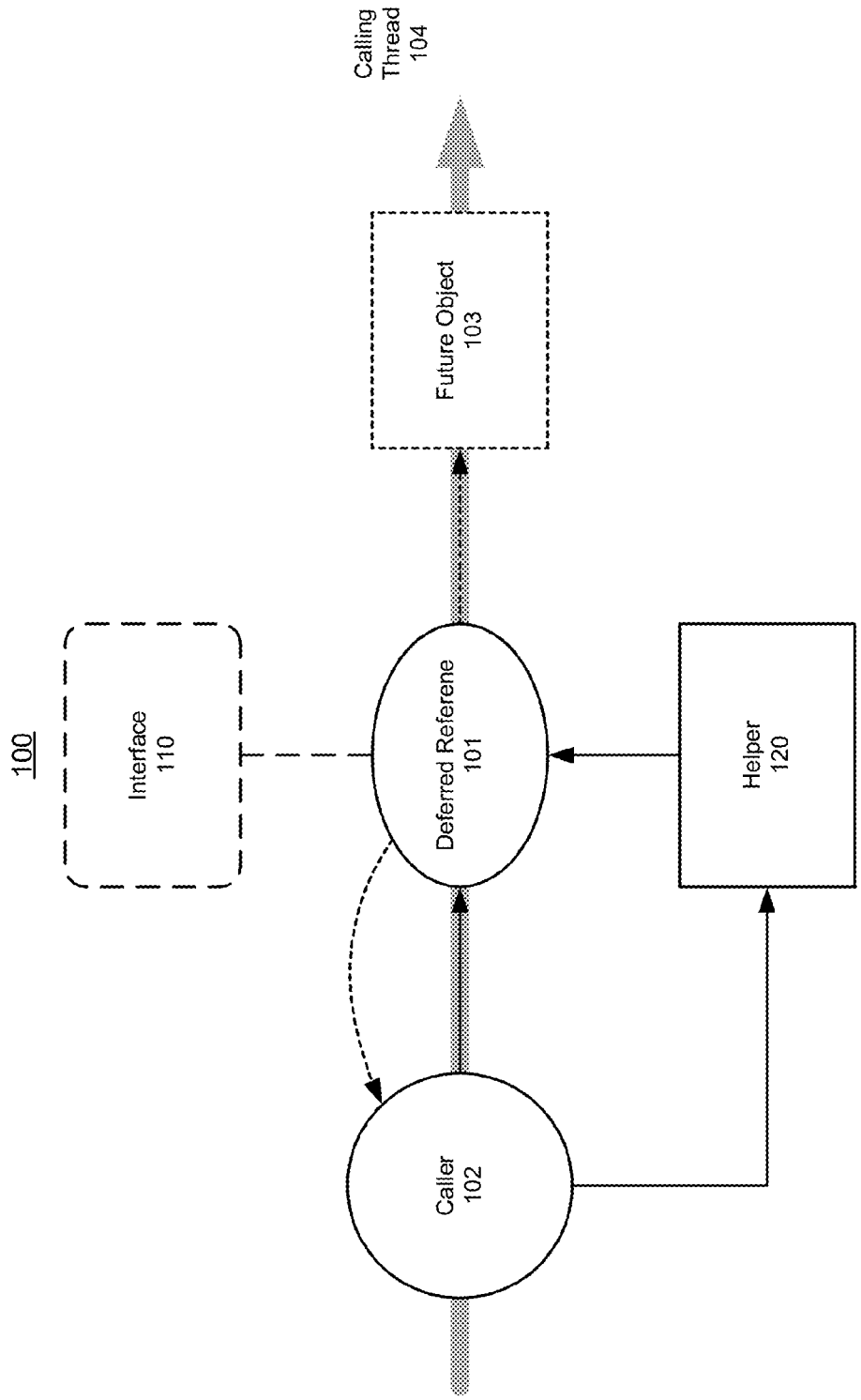
FIG. 1 shows an illustration of supporting a deferred reference in an object-oriented programming (OOP) environment in accordance with various embodiments of the invention.

FIG. 1 shows an illustration of supporting a deferred reference in an OOP environment in accordance with various embodiments of the invention. As shown in FIG. 1, an OOP environment 100, e.g. a JAVA programming environment, can provide a differed reference 101 to a future object 103. The differed reference 101 can be based on an interface 110, which can define a deferred type in the OOP environment 100. The future object 103 can be an object, e.g. a Server, a Member, a Connection, an Mbean, a Value, and a Condition, that will be available at a future time.

In the OOP environment 100, a caller 102 can send a request, e.g. a get method, to obtain the future object 103 based on the deferred reference 101. The computation to resolve the referent, or the future object 102, may not start until the get method is called. On the other hand, the return of the deferred reference 101 to the caller 102 happens immediately.

After receiving the request from the caller 102, the OOP environment 100 can provide an indication to the caller 102 that the future object 103 is not currently available. Alternatively, the OOP environment can return the future object 103 to the caller 102 as soon as it becomes available.

In accordance with various embodiments of the invention, the OOP environment can avoid blocking a calling thread 104 that the caller 102 uses to request for the future object 102, while waiting for the future object 102 to become available. Such an asynchronized model can be beneficial, since the calling thread 104 can be responsible for other important tasks.

Furthermore, the OOP environment 100 can use one or more helpers 120 to extend the functionalities of a deferred reference 101. Also, the OOP environment 100 allows for nesting another deferred reference into the deferred reference 101.

In accordance with various embodiments of the invention, the OOP environment can provide a future class definition, e.g. a JAVA Future class, which can represent the result of an asynchronous operation that has been requested.

Using the deferred reference 101 of a future object 102, the OOP environment can avoid various problems associated with the JAVA Future class. For example, the computation to resolve the value may start when the future class is created. Furthermore, the future classes may force the calling threads to wait. For example, the JAVA Future classes can provide a Future.get( ) method that must block the calling thread to wait forever until a value is produced, or a Future.get(time) method that blocks calling thread for a specified amount of time. Both methods force developers to write blocking algorithms, which are not asynchronous.

In accordance with various embodiments of the invention, the deferred reference 102 can be enabled as part of a software package, such as part of a com.oracle.tools.deferred package in Oracle Coherence Incubator Common, or be enabled in a separate jar for wider uses.

Additionally, the OOP environment 100 can provide a mechanism for an application to be notified when a deferred object becomes available. This allows developers to define one or more deferred references together with callbacks to be notified when the underlying objects become available. Thus, the underlying object-oriented programming language can inform the application developer when objects are no longer "deferred".

FIG. 2 shows an illustration of an exemplary interface for defining a deferred type in an OOP environment in accordance with an embodiment of the invention. As shown in FIG. 2, an interface Deferred can be used, or implemented, to provide a deferred reference to an object that will be available at a future time (Line 1). The interface Deferred includes a get( ) method that can returns the deferred reference (Line 3), and a getDeferredclass( ) method that can determine the class of the referent without actually existing (Line 5).

When the get( ) method is invoked by a caller, the object-oriented programming language environment can avoid blocking the calling thread, while waiting for the future object to become available. Unlike the JAVA Future classes, which waits for the result value to be produced, the get( ) method in the interface Deferred returns a reference to the future object immediately.

Furthermore, the OOP environment can return a NULL value or throw a runtime exception if the object is not currently available. Also, the object-oriented programming language environment can throw an object not available exception (e.g. an ObjectNotAvailableException) if the object may never become available.

In accordance with various embodiments of the invention, the OOP environment can provide different types of deferred helpers for extending the functionalities of a deferred reference.

For example, a deferred helper, which is shown in the following, can ensure that the caller waits a certain period of time for the object to become available, or retries after a certain period of time.

```
Deferred<T> deferred = ...
Deferred<T> ensured = new Ensured(deferred, timeout);
```

In the OOP environment, an ensured Deferred type can use a deferred implementation (wrapper) that waits a certain amount of time for an object in a Deferred type to become available. Here, any Deferred type can be ensured. The ensured Deferred type allows the nested Deferred types without a need of nested timeouts.

Furthermore, the Deferred types do not implement blocking semantics, while only Ensured types do. The ensured Deferred allows "waiting" with customizable semantics, while the Deferred types may never block the calling thread. For example, the Deferred types can throw an (runtime) ObjectNotAvailableExceptions when the referents are assumed to never to become available.

As shown in the following, the OOP environment can resolve a deferred value by waiting a maximum (default) period of time, or retrying after a default period of time.

public <T> T ensure(Deferred<T> deferred);

Additionally, the object-oriented programming language environment allows the caller to specify an explicit maximum time out.

public <T> T ensure(Deferred<T> deferred, long duration, TimeUnit unit);

In accordance with an embodiment of the invention, the OOP environment can support deferred method invocation based on the concept of deferred helpers.

For example, as shown in the following, a recording dynamic proxy of an interface and/or object can be created.

public <T> T invoking(T t);

Thus, the OOP environment can obtain a "recording" dynamic proxy of a Deferred type, deferred.

public <T> T invoking(Deferred<T> deferred);

Additionally, the OOP environment can obtain a Deferred type representing the last recorded invoking call as shown in the following.

public <T> Deferred<T> eventually(T t);

Finally, the OOP environment can obtain a deferred type, Deferred<Integer>, that represents the last recorded invoking call to list.size.

Deferred<Integer> defSize=eventually(invoking(list).size( ));

Thus, a value concerning the last recorded dynamic proxy of the object can be returned to a caller as a deferred value, e.g. a deferred integer can represent the size of a list at a future time. Additionally, a deferred reference can be nested into another deferred reference.

Additionally, as shown in the following, the OOP environment can support method chaining.

Deferred<Boolean> defHasElements=eventually(invoking(list).getEnumeration( ).hasElements( ));

Also, the object-oriented programming language environment can support deferred method invocation on a deferred type.

Deferred<Integer> defSize=eventually(invoking(defClusterMBean).getSize( ));

The deferred reference can be beneficial in a distributed data environment. For example, instead of using multiple try blocks, a simple test can ensure that a cluster reaches a certain size by simply calling the following to ensure that the virtual machine and Mbean server in the distributed data environment are available.

assertthat(eventually(invoking(defClusterMbean).getSize( )), is (4))

Furthermore, the OOP environment can provide various other deferred helpers. For example, there can be a deferred helper that can cache a result of a successful get( ) request.

public <T> Deferred<T> cached(Deferred<T> deferred);

Also, a deferred helper can convert a value T into a Deferred<T>.

public <T> Deferred<T> deferred(T t);

Additionally, the OOP environment can obtain Java Future representation of a deferred type.

public <T> Future<T> future(Deferred<T> deferred);

EXAMPLES

FIG. 3 shows an illustration of an exemplary software pseudo code for acquiring management bean information from a server, in accordance with an embodiment of the invention. As shown in FIG. 3, a caller can establish a connection to a server, e.g. a JMX MBeanServer instance (Line 5) before retrieving related management bean information, e.g. an MBeanInfo instance, based on the name of an object, objectName (Line 6).

The OOP environment may need to ensure that various conditions are satisfied before acquiring the management bean information from the server. For example, a virtual machine, e.g. a JAVA virtual machine (JVM), on which the JMX MBeanServer instance is running, may need to be started before the JMX MBeanServer can be created. Furthermore, a server connection, e.g. the MbeanServerConnection may need to be available with the MBean registered. In addition, the object-oriented programming language environment may also need to handle various other exceptions, such as the IOException, InstanceNotFoundException, ClassCastException.

In accordance with various embodiments of the invention, the object-oriented programming language environment can use try blocks, as shown in the following, to ensure that these conditions can be satisfied.

```
while(true) {
... try to get reference ...
if (failed) Thread.sleep(10000);
if (succeeded) break;
}
```

The above approach of using try blocks may cause different problems, e.g., how long should the thread sleep, and how to allow the try block to fail or succeed earlier. Additionally, the code can become overly complicated and difficult to understand when there are too many retry loops.

Using the ensuring deferred types as defined in FIG. 2, a DeferredJMXConnector instance can be created in the following.

Deferred<JMXConnector> defJMXConnector=new DeferredJMXConnector(jmxConnectionURL, env)

Then, a deferred MBeanInfo can be created.

Deferred<MBeanInfo> defMBeanInfo=new DeferredMBeanInfo(defJMXConnector, objectName)

Thus, the code for acquiring management bean information from a server can be simply implemented as:

MBeanInfo info=ensure(defMbeanInfo);

or

MBeanInfo info=ensure(defMbeanInfo, 2, TimeUnit.MINUTES).

As shown in the above, using the ensuring deferred types, the ensuring deferred types can isolate "waiting" logic into the ensuring method that takes a deferred type as a parameter. Furthermore, the ensuring deferred types allow nested deferred types without nested timeouts.

In the examples as shown in the following, the OOP environment can assert that a service is running.

assertThat(eventually(invoking(CacheFactory.getService ("some-service").isRunning( )), is(true));

Also, the OOP environment can assert that two named cache, cacheA and cacheB are equal.

```
NamedCache cacheA = ...;
NamedCache cacheB = ...;
assertThat(eventually(cacheA), is(equalTo(cacheB)));
```

Figure 4:
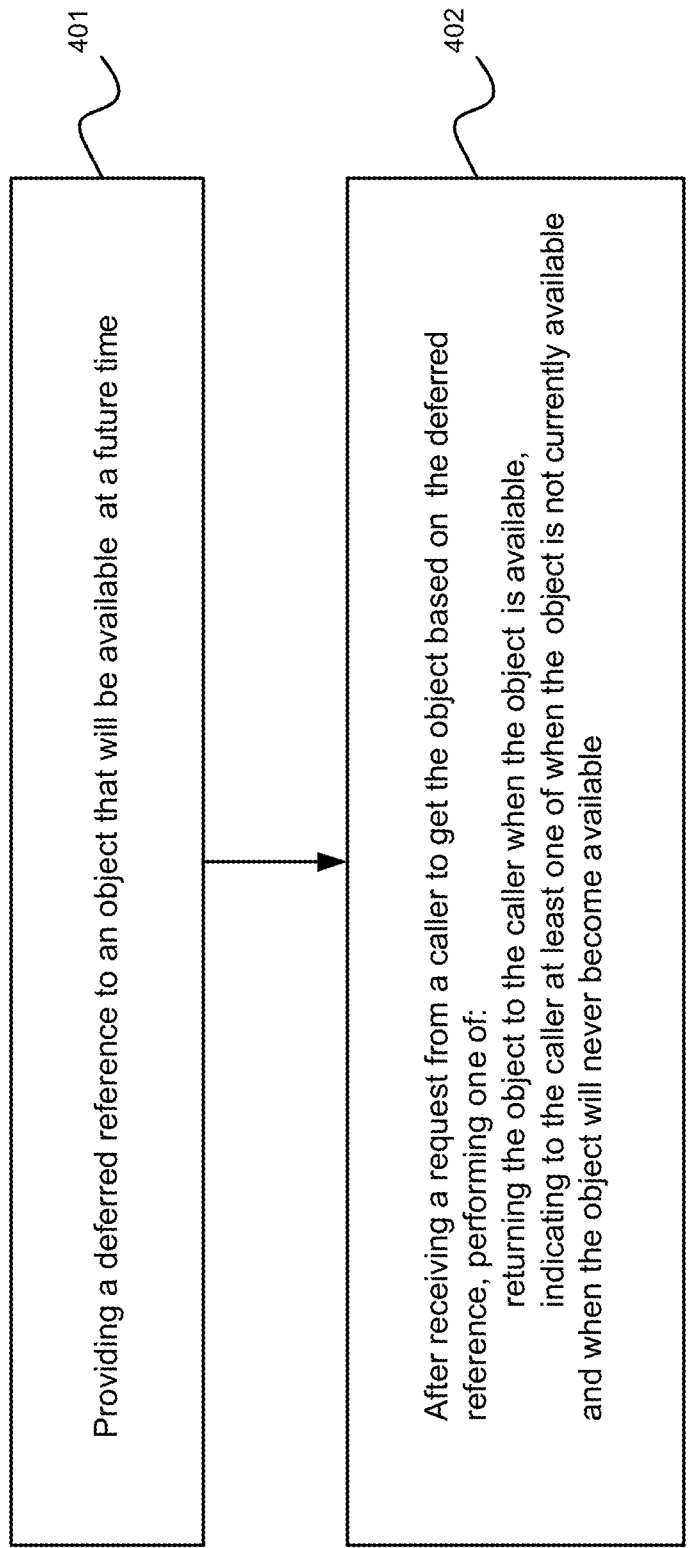
FIG. 4 illustrates an exemplary flow chart for supporting a deferred reference in an OOP environment in accordance with an embodiment of the invention.

FIG. 4 illustrates an exemplary flow chart for supporting a deferred reference in an OOP environment in accordance with an embodiment of the invention. As shown in FIG. 4, at step 401, the OOP environment can provide a deferred reference to an object that will be available at a future time. Furthermore, at step 402, after receiving a request from a caller to get the object based on the deferred reference, the OOP environment can return the object to the caller when the object is available or can indicate to the caller when the object is not currently available and/or when the object will never become available.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a deferred reference in an object-oriented programming language environment operating on one or more microprocessors, comprising:
   providing a deferred interface for calling an object that will be available at a future time;
   receiving a get request from a caller to get the object and the object class using the deferred interface; and
   in response to receiving said get request,
      immediately returning to the caller a deferred reference to the object,
      informing the caller which class the object is associated with before the object becomes available,
      returning the object to the caller when the object is available, and
      indicating to the caller at least one of whether the object is not currently available and whether the object will never become available.

2. The method according to claim 1, further comprising:
   avoiding blocking a calling thread that the caller uses to request the object using the deferred interface while waiting for the object to become available.

3. The method according to claim 1, further comprising:
   throwing a runtime exception or returning a NULL value, when the object is not currently available; and
   throwing an object not available exception, if the object will never become available.

4. The method according to claim 1, further comprising:
   throwing a runtime exception or returning a NULL value, when the object is not currently available.

5. The method according to claim 1, further comprising:
throwing an object not available exception, if the object will never become available.

6. The method according to claim 1, further comprising:
specifying a period of time for which the caller waits for the object to become available.

7. The method according to claim 1, further comprising:
creating the deferred reference to the object based on a class definition associated with the object.

8. The method according to claim 1, further comprising:
nesting the deferred reference into another deferred reference.

9. The method according to claim 1, further comprising:
obtaining a recording dynamic proxy of the object, and
providing a deferred representation of a most recently recorded call by the recording dynamic proxy of the object.

10. The method according to claim 1, further comprising:
providing a mechanism for an application to be notified when the object identified in a deferred reference becomes available.

11. A system for supporting a deferred reference in an object-oriented programming language environment, comprising:
one or more microprocessors;
a deferred interface running on the one or more microprocessors, wherein the deferred interface supports calling an object that will be available at a future time;
wherein the deferred interface is configured to, receive a get request from a caller to get the object and the object class using the deferred interface; and
wherein in response to receiving said get request said deferred interface, is configured to immediately return to the caller a deferred reference to the object,
    inform the caller which class the object is associated with before the object becomes available,
    return the object to the caller when the object is available, and
    indicate to the caller at least one of whether the object is not currently available and whether the object will never become available.

12. The system according to claim 11, wherein:
the deferred interface is capable of avoiding blocking a calling thread that the caller uses to request the object using the deferred interface while waiting for the object to become available.

13. The system according to claim 11, wherein:
the deferred interface is capable of throwing a runtime exception or returning a NULL value, when the object is not currently available and throwing an object not available exception, if the object will never become available.

14. The system according to claim 11, wherein:
the deferred interface is capable of throwing a runtime exception or returning a NULL value, when the object is not currently available.

15. The system according to claim 11, further comprising:
the deferred interface is capable of throwing an object not available exception, if the object will never become available.

16. The system according to claim 11, wherein the deferred interface further comprises:
a helper that is capable of specifying a period of time for which the caller waits for the object to become available.

17. The system according to claim 11, wherein the deferred interface further comprises:
a helper that is capable of creating a deferred reference to an object based on a class definition associated with the object.

18. The system according to claim 11, wherein:
the deferred interface allows for nesting a deferred reference into another deferred reference.

19. The system according to claim 11, wherein the deferred interface further comprises:
a helper that is capable of
    obtaining a recording dynamic proxy of the object, and
    providing a deferred representation of a most recently recorded call by the recording dynamic proxy of the object.

20. A non-transitory machine readable storage medium having non-transitory instructions stored thereon for supporting a deferred reference in an object-oriented programming language environment, which instructions, when executed by a computer system, cause the computer system to perform steps comprising:
providing a deferred interface for calling an object that will be available at a future time;
receiving a get request from a caller to get the object and the object class using the deferred interface; and
in response to receiving said get request,
    immediately returning to the caller a deferred reference to the object,
    informing the caller which class the object is associated with before the object becomes available,
    returning the object to the caller when the object is available, and
    indicating to the caller at least one of whether the object is not currently available and whether the object will never become available.

* * * * *

UNITED STATES PATENT AND TRADEMARK OFFICE
CERTIFICATE OF CORRECTION

PATENT NO. : 9,104,404 B2
APPLICATION NO. : 13/783024
DATED : August 11, 2015
INVENTOR(S) : Oliver Page 1 of 1

It is certified that error appears in the above-identified patent and that said Letters Patent is hereby corrected as shown below:

On the Title page, item (54) and in the Specification, Column 1, line 3, (Title), delete "OBJECTED-ORIENTED" and insert -- OBJECT-ORIENTED --, therefor.

Signed and Sealed this
Twenty-first Day of June, 2016

Michelle K. Lee
*Director of the United States Patent and Trademark Office*